Dec. 23, 1969 C. W. ELSENHEIMER 3,484,907

ADJUSTABLE CLOSURE DEVICES

Filed Oct. 24, 1965 6 Sheets-Sheet 1

INVENTOR.
CHARLES W. ELSENHEIMER
BY
John J. Hart
ATTORNEY

Dec. 23, 1969 C. W. ELSENHEIMER 3,484,907

ADJUSTABLE CLOSURE DEVICES

Filed Oct. 24, 1965 6 Sheets-Sheet 2

INVENTOR.
CHARLES W. ELSENHEIMER

BY

[signature]

ATTORNEY

INVENTOR.
CHARLES W. ELSENHEIMER
BY
John J. Hart
ATTORNEY

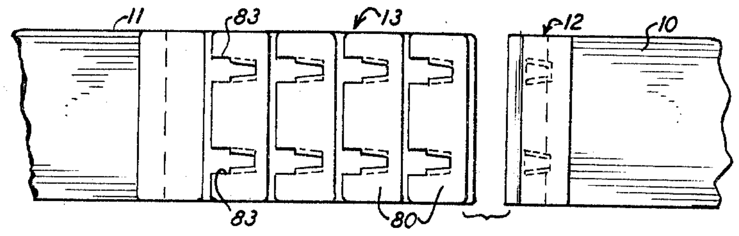
FIG. 30
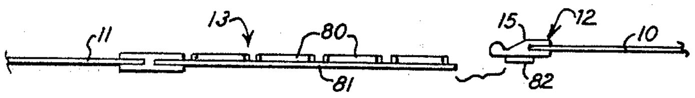
FIG. 31
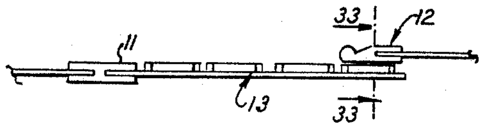
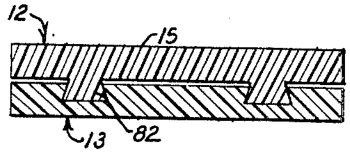
FIG. 32 FIG. 33
INVENTOR.
CHARLES W. ELSENHEIMER
BY
John J. Hart
ATTORNEY INVENTOR.
CHARLES W. ELSENHEIMER
BY
John J. Hart
ATTORNEY INVENTOR.
CHARLES W. ELSENHEIMER
BY
John J. Hart
ATTORNEY United States Patent Office 3,484,907
Patented Dec. 23, 1969

3,484,907
ADJUSTABLE CLOSURE DEVICES

Charles W. Elsenheimer, Meriden, Conn., assignor to Prentice Corporation, Kensington, Conn., a corporation of Connecticut Filed Oct. 24, 1965, Ser. No. 504,687
Int. Cl. A44b *17/00, 19/00*
U.S. Cl. 24—206 14 Claims

ABSTRACT OF THE DISCLOSURE

The fastening device herein disclosed is composed of a pair of flexible tapes each adapted to be connected at one end to an article and having connected to its other end a plastic closure member interlockable in overlapping relation with the closure member on the other tape. Each of said members has at its inner end a flat root section provided with an endwise slot into which is inserted the end of a tape and to which it is permanently bonded, and projecting from such root section an interlocking portion forming an extension of the tape. One of the projecting portions is flexible longitudinally and is provided with a plurality of longitudinally arranged transverse slots which are selectively engageable by an elongated transverse locking element provided on the other projecting portion which is substantially rigid longitudinally relative to said one projecting portion. The locking element is configured to engage in a snap fit with the side edges of each of the slots and to disengage from the latter when said one projecting portion is flexed away from the other projecting portion.

This invention relates to adjustable closure devices and more particularly to a closure device which has especial superiority when embodied in brassieres, but which also can be used to advantage in other articles such as overshoes, luggage, etc.

At the present time brassieres are usually provided with the hook and eye type of closure to secure them in position on the wearer. While this type of closure provides an effective method of fastening a brassiere, it possesses a number of drawbacks which make its use not entirely satisfactory. For example, the associated hooks and eyes have to be fastened individually and as this usually must be done at the back of the wearer, it is a somewhat difficult operation. Further, in making the brassieres with a hook and eye closure, there is required an elaborate stitching process to first secure the hooks and eyes firmly to the cotton or nylon tapes usually employed in brassieres, and then the tape with such fastener elements secured thereto, is cut to suitable lengths and the latter are attached to the body of the brassiere. These operations are complicated and costly and substantially lengthen the time required to make a brassiere. In the use of the brassiere, the hooks and eyes often rust and stain the fabric of the article. Further, the eyelets wear out quite rapidly and many women fail to get full use of a brassiere because of the failure of such eyes. It is true that there are a number of brassiere hook and eye repair kits on the market, but many women will not be bothered with the problem of repairing a brassiere.

The primary purpose of the present invention is to provide a brassiere closure which is free of the aforesaid disadvantages of the present type of hook and eye closure employed in such articles.

One of the objects of the invention is to provide a closure device which is so simple in construction that it can be made and assembled rapidly on brassieres on a mass production basis.

Another object of the invention is to provide a novelly constructed closure which is light and flexible and can be closed in a simple manner merely by the application of slight pressure.

A further object of the invention is to provide a rust free, durable closure capable of extending the life of the brassiere substantially beyond that of present day constructions having hook and eye closures.

A still further object of the invention is to provide a novel method of manufacturing the closure rapidly and at minimum cost.

Other objects of the invention as well as the features of novelty thereof will become apparent from the following description when read in connection with the accompanying drawings, in which:

FIG. 30 is a front elevational view of the separated parts of another embodiment of the invention;

FIG. 31 is a top view of the separated parts shown in FIG. 30; and

FIG. 32 is a top view of such parts in assembled condition;

FIG. 33 is a sectional view taken along the line 33—33 of FIG. 32;

Figure 1:
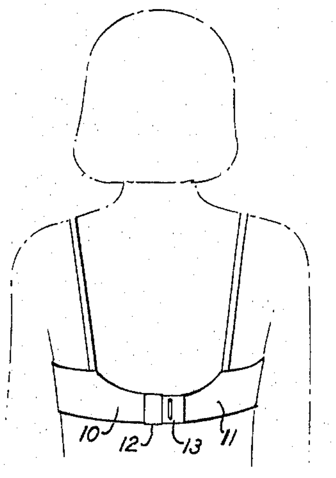
FIG. 1 is a rear view of a model wearing a brassiere embodying the invention.
Figure 2:
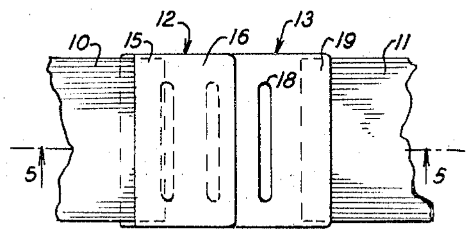
FIG. 2 is an enlarged view of the closure shown in FIG. 1.
Figure 3:
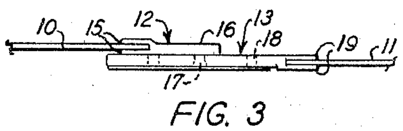
FIG. 3 is a top view of the parts shown in FIG. 2.

Before entering into a detailed description of the construction of the various embodiments illustrated in the drawings, it is believed advisable to first point out with the aid of FIG. 1 of the drawings, that the closure of the invention is composed of two flexible pieces or strips 10, 11, to the opposed ends of which are attached the male and female closure or fastener elements 12 and 13, respectively, and which are secured at their other ends to the article which may be a brassiere as indicated in FIG. 1. The flexible pieces 10, 11 may be made of fabric, such as the elastic cotton or nylon tapes normally used in brassieres, or may be made of any other suitable, flexible material. The closure elements 12 and 13 are made of plastic material, preferably a resilient plastic material such as polyethylene, Delrin or polypropylene, and are attached to the flexible pieces 10, 11, respectively, by a heat sealing method of a type which will be hereinafter described. For the purposes of simplicity, the flexible pieces and closure elements shown in the several views will be indicated generally by the same reference numerals applied to the closure illustrated in FIG. 1 of the drawings.

Figure 4:
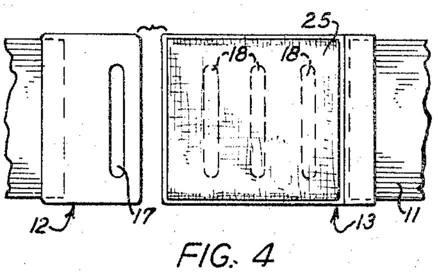
FIG. 4 is a view similar to FIG. 2, but showing the closure parts separated.

Referring now more particularly to FIGS. 2–5 of the drawings, the top or male member 12 is constituted of a plastic material such as Delrin, polypropylene, or polyethylene, and is formed to provide a root section composed of two spaced parallelly disposed inner end flanges 15 between which is secured by heat sealing one end of the tape 10. The projecting portion 16 of member 12 is provided with an integral transverse locking element 17 which interlocks with the transverse locking elements 18 arranged in spaced relation on the bottom or female member 13. Like the male member, the female member which is composed of polyethylene, is provided with two spaced, parallelly disposed inner end flanges 19 to receive an end of the tape 11, the flanges and tape being secured together by heat sealing. It will be seen from FIG. 5 of the drawings, that each locking element 18 is in the form of an opening having a reduced top end portion 20 so that there is formed a shoulder 21 within the opening 18. The locking element is foot-shaped in cross-section and is provided with a toe-shaped inner or rear edge 22 which is inserted into the opening 18 and engages in locked relation under the bead-shaped wall 23 of opening 18 which is opposite to the shoulder 21 thereof. The toe-shaped edge or portion 22 is maintained in such locked relation by a heel-shaped edge or portion 24 on the member 17 and which interlocks with shoulder 21. This interlocked engagement of the two members 12 and 13 is attained by exercising a relatively light pressure on member 12 sufficient to cause a distortion of the resilient plastic material such as will enable the two to interlock with a snap action. The two members may be readily separated by pressing inwardly on the flanged end of either member while holding the other member firm. In the locking and unlocking actions of the closure the female member 13 tends to flex or bend under the applied pressures to facilitate such action. As shown in FIG. 4 of the drawings, the female member 13 may have a backing 25 of cotton, rayon or nylon heat sealed to the underside of such member.

Figure 5:
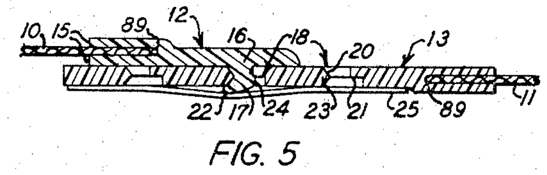
FIG. 5 is a sectional view taken along the line 5—5 of FIG. 2.
Figure 6:
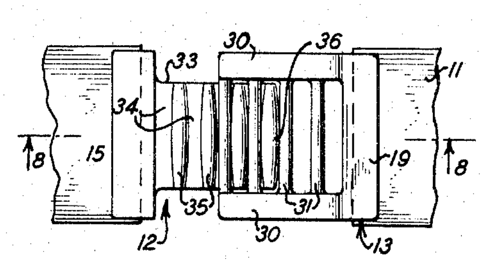
FIG. 6 is a front elevational view of another embodiment of the invention.
Figure 7:
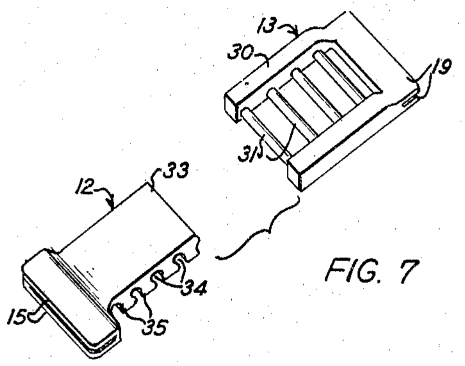
FIG. 7 is a perspective view showing the closure parts of FIG. 6 in separated condition.
Figure 8:
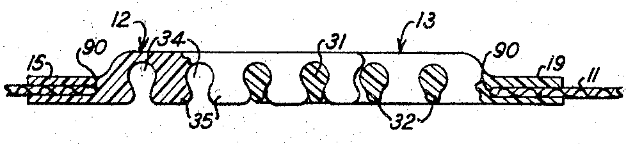
FIG. 8 is a sectional view taken along the line 8—8 of FIG. 6.

The closure shown in FIGS. 6–8 of the drawings is also of a flat overall configuration, and the male and female members 12 and 13, respectively, thereof are connected to the tapes 10 and 11, respectively, in a manner similar to that described with respect to the embodiment of FIGS. 1–5. These same structural features form part of all of the disclosed embodiments of the invention, and consequently it is not believed necessary to repeatedly refer especially to the same as each embodiment is considered in turn. However, the end flanges 15 and 19 on the male and female members 10 and 12, respectively, of the subsequently discussed embodiments, when referred to shall be given the same reference characters. It will also be understood that such end flanges may be formed by molding solid end bars which are then slotted in any suitable manner to form the tape receiving slot or recess between such end flanges.

In the embodiment of FIGS. 6–8 the female member 13 has a pair of elongated side elements 30, 30 integrally connected to and projecting forwardly from the end flanges or root bar 19 thereof. Extending across the space between the side elements 30, 30 and integrally connected at their ends to the latter, are a plurality of transverse locking elements 31 in the form of round bars. The locking elements 31 are essentially circular in cross-section, but have integrally formed along the undersides of the bodies thereof, ribs 32 (see FIG. 8) which both facilitate the locking action of the locking elements 31, and provide resistance to the flexing of such elements or bars as pressure is applied to the top of the closure in effecting the locking interengagement of the male and female parts.

The male member 12 is constituted of a flat plain top wall 33 integrally connected at one end to its slotted root member or flanges 15 and is provided on its underside with transverse grooves or recesses 34 providing transverse legs or teeth 35. As is shown more clearly in FIG. 8 of the drawings, the grooves 34 are formed to snugly receive the bodies of the locking bars or elements 31 and the outer side edges 35 are shaped to reduce the width of the entry openings of such grooves to a dimension less than the diameter of the locking bars. Thus, it is necessary to slightly compress the plastic materials of both the bars 31 and the edges 36 to effect the entry of such bars into the grooves 34. While it is not necessary that the materials of both such elements be compressed, it has been found desirable to do so. It will also be noted from FIG. 6 of the drawings, that the edges 36 of the teeth 35 are convex laterally so that in effecting the locking of the male and female members under pressure, such members will lock with a snap action centrally of such teeth. This configuration of the teeth also facilitate the unlocking of the male and female members by a transverse twisting motion. The dimensions of the bars 31 and teeth 35 are preferably such that although the central portions of the grooves 34 are thus slightly narrowed, a compressive action takes place along the lengths of the bars and teeth in the locking of the male and female members.

Figure 9:
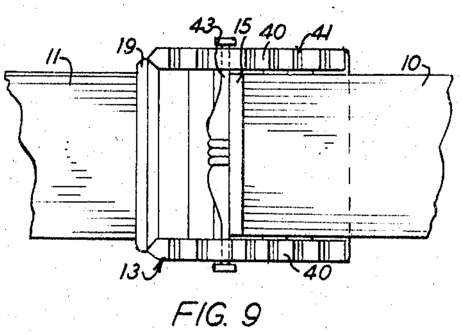
FIG. 9 is a front elevational view of a further embodiment of the invention.
Figure 15:
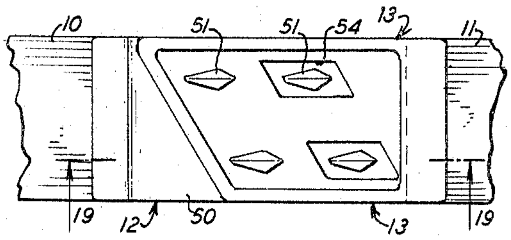
FIG. 15 is a front elevational view of another embodiment of the invention.
Figure 10:
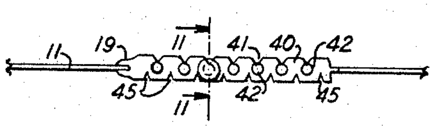
FIG. 10 is a top view of the parts shown in FIG. 9.
Figure 16:
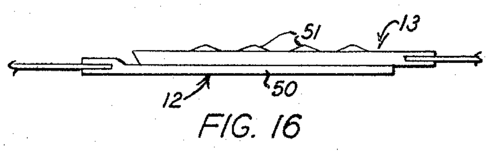
FIG. 16 is a top view of the closure shown in FIG. 15.
Figure 11:
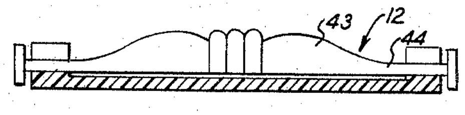
FIG. 11 is a sectional view taken along the line 11—11 in FIG. 10.
Figure 17:
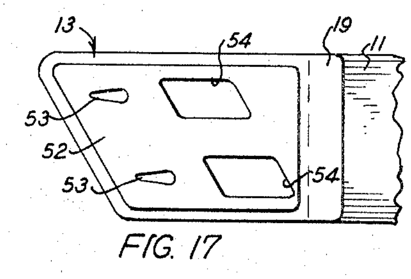
FIGS. 17 and 18 are front elevational views of the separated parts of the closure.

The molded polyethylene closure shown in FIGS. 9–11 of the drawings has a substantially square, flat configuration and is composed of a substantially U-shaped female member 13 formed by the slotted transverse root bar forming the flanges 19, and the integrally connected forwardly extending side elements or legs 40, 40. The two legs 40, 40 are provided with aligned V-shaped indentations or notches 41, each of which communicates at its bottom with a circular hole 42 formed in the center of the leg and extending the width of the latter.

The male member 12 is constituted of a transverse bar 43 integrally formed with its slotted transverse root bar 15 and having end locking portions 44 of round shape adapted to be received by a selected pair of aligned V-shaped indentations 41 and to be pressed therethrough into the associated holes 42. It will be understood that when pressure is applied, the plastic material at the bases of the V-shaped indentations mill distort and permit the bar ends 44 to be snapped into locked position in the holes 42. Adjustment of the brassiere can be accomplished by selecting different sets of indentations 41 on the female member.

The legs 40, 40 of the female member are also provided on their undersides with aligned V-shaped indentations or notches 45 which are inverted and located between the upper V-shaped indentations 41. The inverted indentations 45 enable the legs 40, 40 to bend slightly inwardly and outwardly in its longitudinal plane thus increasing its flexibleness and consequently facilitating its operation and increasing its comfort during wear.

Figure 12:
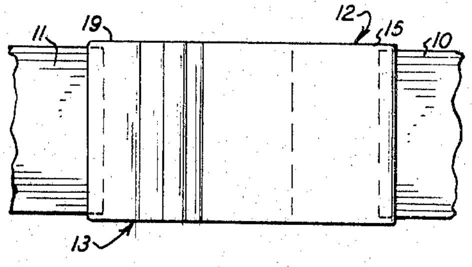
FIG. 12 is a front elevational view of another embodiment of the invention.
Figure 18:
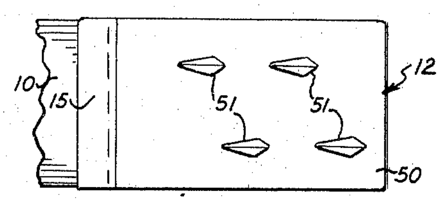
Figure 13:
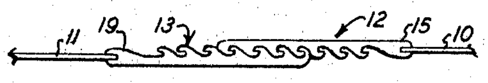
FIG. 13 is a top view of the parts shown in FIG. 12.
Figure 19:
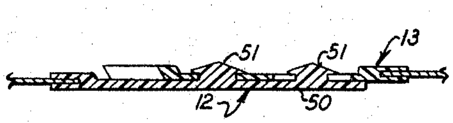
FIG. 19 is a sectional view taken along the line 19—19 of FIG. 15.

In the polyethylene fastener shown in FIGS. 12 and 13 of the drawings the male and female members are substantially alike in construction, each being provided on opposed faces with a series of transverse teeth having curved ends which interengage with similar teeth on the other member. This is accomplished under pressure, the teeth being slightly distorted under the pressure to enable the interlocking thereof to occur.

Figure 14:
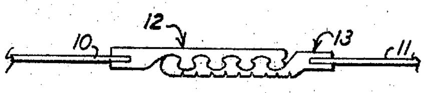
FIG. 14 is a top view of a modification of the closure shown in FIGS. 12 and 13.

FIG. 14 shows a construction which resembles that of FIGS. 12 and 13 in construction, but in which the transverse teeth of both the male and female members are formed in the manner of the teeth in the male member of the embodiment shown in FIGS. 6 to 8 of the drawings.

In the closure construction shown in FIGS. 15–19 of the drawings, the male member 12 is preferably made of medium or high density polyethylene, and the female member 13 is preferably made of low density polyethylene or polyurethane. The male member is composed of a plate 50 integrally connected to and projecting out from its root bar 15 and having integrally formed on its upper surface two pairs of laterally offset diamond-shaped mushroom projections 51. The female member 13 is also composed of a suitably shaped plate 52 integral with and projecting outwardly from its root bar 19 and provided with a pair of laterally offset slots formed to cooperate with either pair of the projections 51 on the male member. It will be understood that in the interlocking of the two members the diamond heads of the projections 51 will spread or distort the openings 53 to enable their insertion therethrough, whereupon the resilient material of the plate 52 will spring back and interlock with the heads of the projections. The female plate 52 is provided with enlarged openings 54 to receive the second pair of projections 51 when the two members are interlocked in the manner shown in FIG. 15 of the drawings.

Figure 20:
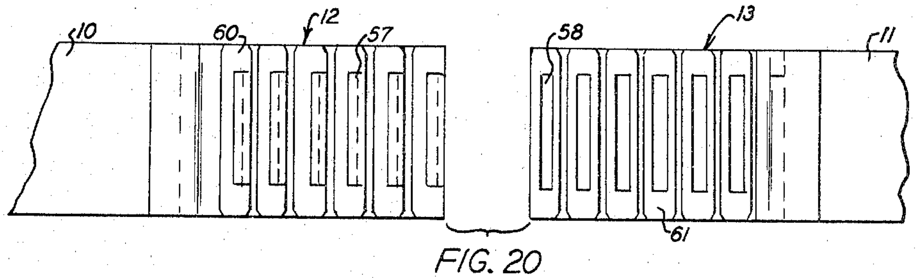
FIG. 20 is an exploded view showing in front elevation, the two parts of another embodiment of the invention.
Figure 21:
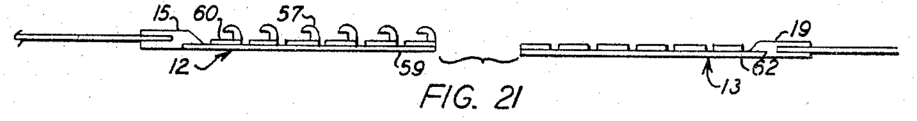
FIG. 21 is a top view of the parts shown in FIG. 20.
Figure 22:
FIG. 22 is a top view, partly in section, of the parts shown in FIG. 20 in interlocked condition.

The closure shown in FIGS. 20–22 of the drawings is a hook type of closure in that the male member 12 is composed of a plurality of transverse hooks 57 adapted to be adjustably received in the series of transverse openings 58 in the female member 13. Both the male and female members of this closure are constructed to provide maximum flexibleness. Thus, the male member is composed of a backing 59 made of cotton-rayon or nylon webbing or tape heat sealed or molded to its root bar 15. The hooks 57 are provided with transverse plate-like footings 60 which are secured by heat in spaced relation to the upper surface of the flexible backing 59. In a similar fashion the transverse plate elements 61 in which are formed the openings 58 of the female member are heat sealed or molded in spaced relation on a cotton-rayon or nylon webbing 62 which in turn is heat sealed at one end to the root bar 19 of the female member. FIG. 22 illustrates the manner in which the hooks 57 of the male member may be interlocked with the openings 58 of the female member.

Figure 23:
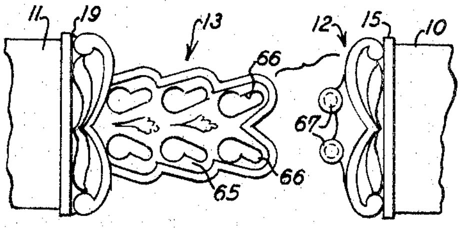
FIG. 23 is a front elevational view of the separated parts of a further embodiment of the invention.
Figure 24:
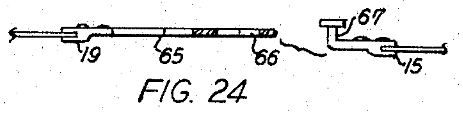
FIG. 24 is a top view, partly in section, of the parts shown in FIG. 23.

The hook type of closure shown in FIGS. 23 and 24 of the drawings is composed of a female member 12 constituted of a polyethylene, thinly molded plate 65 integrally connected to its root bar 19 and provided with three pairs of locking openings 66, each having an enlarged portion to receive the heads of the mushroom shaped hooks 67 and a reduced portion to interlock with such hooks. It will be noted that the male member 12 is provided with two transversely aligned hooks 67 and that the reduced portions of the openings 66 in each pair thereof are arranged in diverging relation. Thus, when the shanks of the hooks 67 enter into the diverging reduced portions of any pair of openings 66 in the female member and are pulled tightly, the consequent wedging action and friction, together with the mushroom heads of the hooks, will maintain the fastener closed. To open the fastener, all that is necessary is to force the hooks back into the larger portions of the openings 66 from which they can readily be disengaged.

Figure 25:
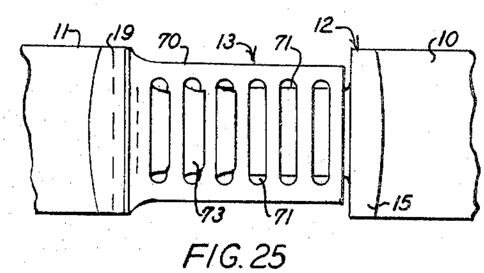
FIG. 25 is a front elevational view of another embodiment of the invention.
Figure 26:
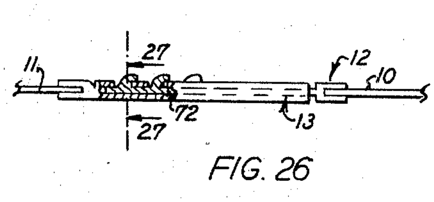
FIG. 26 is a top view, partly in section, of the parts shown in FIG. 25.
Figure 27:
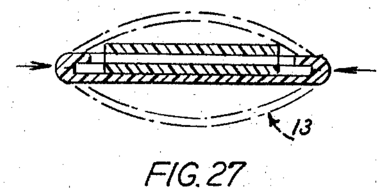
FIG. 27 is a section taken along the line 27—27 of FIG. 26.

FIGS. 25–27 of the drawings show a female part 13 composed of an elongated piece of tubing 70 heat sealed to its root bar 19. The tubing 70 may be a cotton or nylon tubing impregnated with polyethylene to give it sufficient body rigidity to maintain the tubing normally in a closed condition as shown in the drawings, but enabling it to be opened as is indicated by dotted lines in FIG. 27 of the drawings, by exerting pressure on the sides thereof. On one side of the tubing there is provided a series of spaced locking elements in the form of openings 71 cut out of the material of the tubing.

The male member 12 is composed of a tongue 72 made of a high density polyethylene and integrally formed with its root bar 15. Along the length of the tongue 72 is molded a series of spaced transverse hooks 73 adapted to interengage with the openings 71 of the tubing 70. It will be understood that this interengagement is attained by pressing on the sides of the tubing 70 to open the same and then inserting the tongue 73 thereinto to the desired extent and engaging the hooks 73 thereof with the openings 71 from the inside of the tubing. When this has been accomplished the pressure on the sides of the tubing will be released and the hooks will then be secured in locked condition. The hooks can readily be released again by pressing on the sides of the tubing to open it up sufficiently to effect such release. It is within the contemplation of the invention to make the tubing wholly of a suitable plastic material such as polyethylene, instead of making it of an impregnated fabric.

Figure 28:
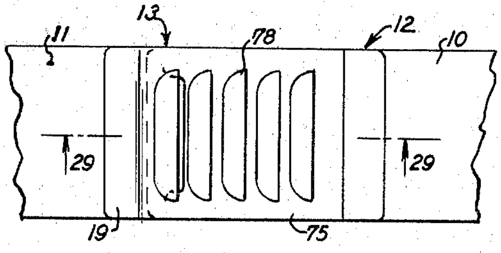
FIG. 28 is a front elevational view of another closure embodying the invention.
Figure 29:
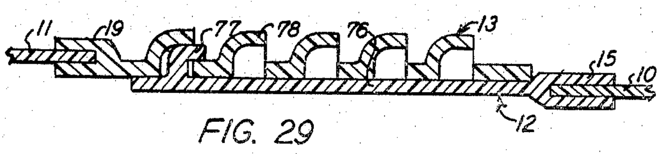
FIG. 29 is a sectional view taken along the line 29—29 of FIG. 28.

In the brassiere fastener of FIGS. 28 and 29, the female member 13 is constituted of a plate 75 molded into a louver shape and the male member 12 is composed of a plate 76 having formed thereon a hook 77 adapted to enter into an opening under one of the hoods 78 formed by the louver construction of the plate 75. Once the hook has been inserted into such position, it cannot back out readily because of the hood 78 over the engaged opening, but it can be readily manipulated to a disengaged condition when this is desired.

The closure construction shown in FIGS. 30–33 of the drawings is essentially the same as that shown in FIGS, 20–22 of the drawings in that the female member 13 is composed of a plurality of plates 80 secured in spaced relation with the aid of heat to a backing 81 constituted of cotton-rayon or nylon webbing, The male member 12 is composed of a pair of transversely aligned keystone-shaped hooks provided on the underside of its root bar 15 and adapted to wedgedly engage with the wedge-shaped openings 83 provided in the plates 80 of the female member.

Figure 34:
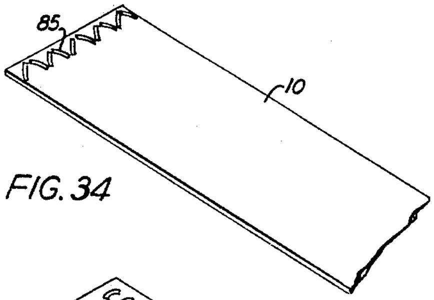
FIGS. 34, 35, 36 and 37 are perspective views showing how the tapes may be prepared for assembly of the closure elements thereon.
Figure 35:
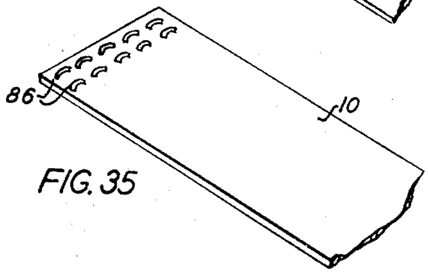
Figure 36:
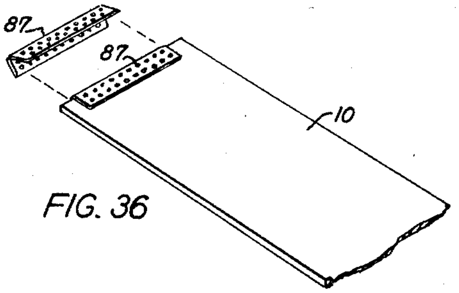
Figure 37:
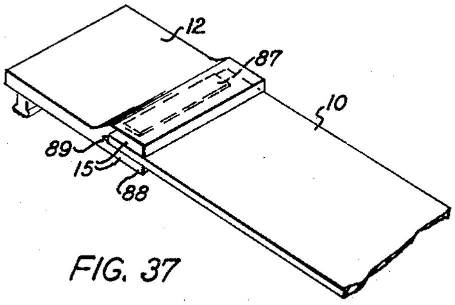

The methods of heat sealing the male and female members of the closure to their associated tapes 10 and 11 respectively, in accordance with the invention, will now be described. There are several methods of heat sealing the tapes or side panels of a brassiere to the plastic closure parts 12 and 13. It is important that the heating be rapid and it has been found that this can be attained by both induction heating and dielectric heating. In employing the induction type of heating, it has been found necessary to apply a heat inducer on the end of the tape to which the plastic part is to be secured. This can be done by stitching a fine steel wire 85 to the edge of the tape 10 in the form of a cross-stitch as shown in FIG. 34 of the drawings. The wire can be 430 stainless steel or low carbon steel wire and have a diameter of from 0.010 to 0.012 inch. Other forms of stitching such wire onto the tape may be employed such as the two lines 86, 86 of straight stitching shown in FIG. 35 of the drawings. The heat inducer may also be in the form of a very thin, perforated plate of aluminum, carbon or stainless steel. As is shown in FIG. 36 of the drawings, such a plate 87 is first folded lengthwise and then inserted on and closed tightly against the material of the end portion of the tape 10. The end of a tape with either a stitched wire or plate heat inducer secured thereto is then inserted into the molded slot of the plastic part, for example, the slot 88 between the flanges 15 of the male member 12 as shown in FIG. 37 of the drawings. Preferably, the width of the slot 88 is slightly greater than the combined thickness of the tape material and the heat inducer thereon so that the tape end can readily be inserted thereinto. The thus assembled parts are then placed inside the coil of the induction heater as pressure is applied to the top of the plastic part in the region of the slotted area thereof. The coil is then energized for about a second and a seal is made. In order to prevent crowding of the plastic material when the leaves or flanges 15 of the slot 88 are brought together against the tape during the heat seal operation the root 89 of the slot is preferably made tapered as shown in FIGS. 5 and 37 of the drawings, or it may be provided with a rounded root 90 as shown in FIG. 8 of the drawings. During the application of the heat the plastic will flow around the heat inducer and outwardly therefrom to provide a border around the heat inducer of approximately $\frac{1}{32}$ to $\frac{1}{16}$ inch.

Figure 38:
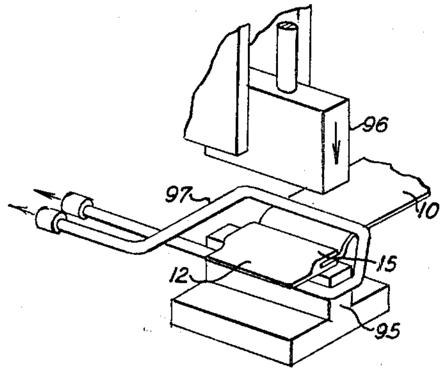
FIGS. 38 and 39 are perspective views of heat sealing devices for attaching the closure elements to the tapes.

A device suitable for heat sealing the plastic parts to the tapes by induction heating is shown in FIG. 38 of the drawings. The plastic part 12 with the metal heat inducer insert of either wire or thin plating as above described provided on the end of the tape 10, and both inserted into the slot between the flanges or leaves 15 of the plastic part, is placed on an insulating and heat resistant transite or lava support block 95 and a guided pressure block 96 moved down to hold the plastic part in place on the block 95. The plastic part so held is located within an electrical induction coil 97 suitably connected to a high frequency generator capable of supplying alternating current of a frequency of approximately 300,000 cycles per second (300 kilocycles). When the current is turned on the held plastic part will therefore be within the magnetic field created around the coil 97. As this field builds up and breaks down at the aforesaid frequency, a series of currents are induced in the metal heat inducer insert between the flanges of the metal part. These currents, called eddy currents, are current losses induced by the magnetic field and are dissipated in the form of heat by the metal insert. If the capacity (kilowatt rating) of the induction unit is large enough, sufficient heat losses will be generated to cause the plastic material around the insert to melt within one second and thereby provide a seal or union between the metal insert, the webbing or tape, and the polyethylene part. If the metal insert is magnetic, additional heat will be generated by hysteresis losses.

Figure 39:
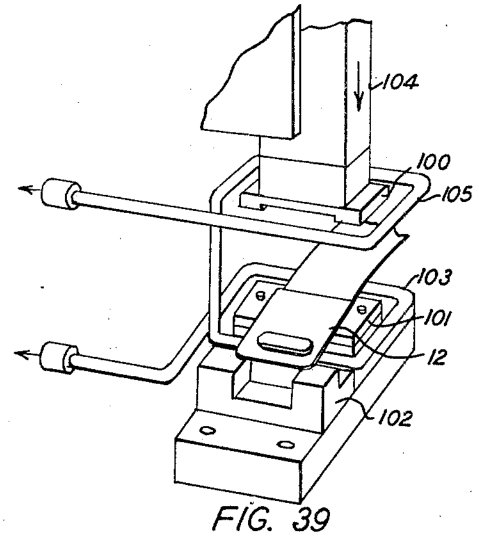
Figure 40:
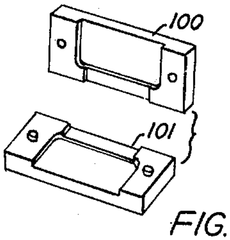
FIG. 40 is a perspective view of the mold parts employed in the device of FIG. 39.

It has been found that heat sealing by induction may also be satisfactorily accomplished without providing a metal heat inducer insert such as shown in FIGS. 34–37 of the drawings on the end of the tape or webbing 10. This may be accomplished, as shown in FIG. 39 of the drawings, with the use of a mold composed of a top mold part 100 and a bottom mold part 101. The mold parts are made of steel and are made with walls as thin as practical for the particular operation, such a mold being known as a "shell" mold. The bottom mold part 101 is mounted on a base 102 made of insulating and heat resistant material such as transite or lava. The bottom mold part is enclosed by a lower portion 103 of an induction coil suitably connected to a source for generating high frequency current. The top mold part 100 is mounted on the lower end of a guided pressure plunger 104 and in its raised or open position is enclosed by the upper portion 105 of the induction coil. It will be noted from a comparison of FIGS. 39 and 40, that the mold parts 100, 101 are constructed so that their internal contour has a shaped exactly the same as the slotted portion of the plastic part 12 which is positioned therebetween, and are cut away at the front and rear to permit the forward end of the plastic part and the web or tape to project therefrom when such mold parts are closed.

In operation, the plastic part is deposited on the lower mold part 101 and the current is turned on. The two mold parts being made of steel are heated rapidly by the magnetic field of the coil due to the eddy and hysteresis currents generated within the mold halves. As the heat seal cycle is set up automatically, the field of the coil causes the mold halves to heat for a few seconds to reach a temperature of about 450°–460° F. whereupon the current will be cut out and the plunger 104 operated to move the top mold part 100 downwardly to closed position. The mold parts will start to cool immediately, but there is still sufficient heat remaining in such parts to cause the plastic of the portion of the part 12 enclosed thereby to melt and flow into the webbing to complete the seal when the mold parts are in their fully closed condition. Cooling of the mold is very rapid and the mold can be opened almost immediately to provide a completely sealed closure part. The cooling of the mold parts may be accelerated by circulating through them a cooling fluid such as water.

Figure 41:
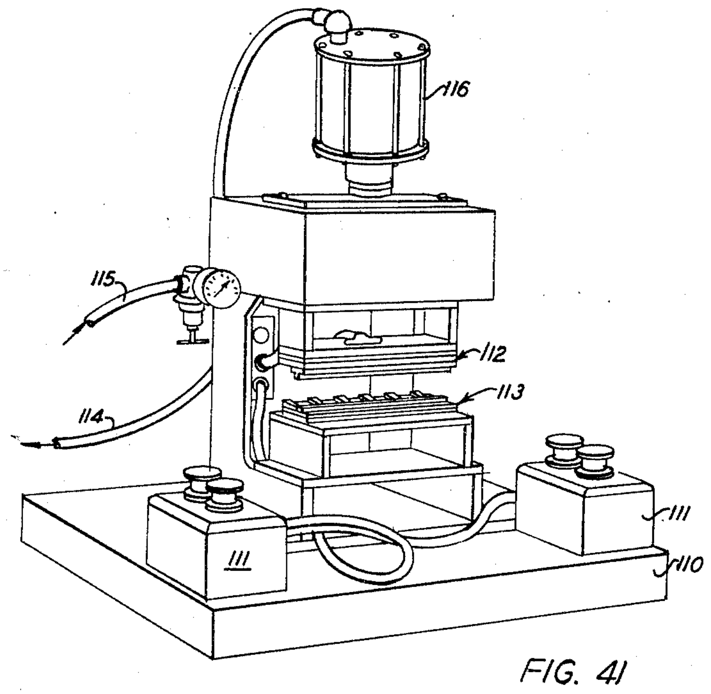
FIG. 41 is a perspective view of another form of heat sealing device that may be employed in manufacturing the closure of this invention.

In the dielectric method of heat sealing, use is made of the characteristics of the materials in effecting a seal between or union of the tape or webbing of the closure and the plastic locking member thereof. The electrical components of a dielectric unit such as shown in FIG. 41 of the drawings, are capable of generating alternating currents having frequencies which are of millions of cycles per second, and plates take the place of the induction coils employed in the types of induction units above described. It has been found that if a high frequency current is placed upon the plates and insulating material is placed between them, the field generated between the two plates will effect the molecules of such material. The faster the field alternates, the greater the magnitude of the field, and consequently the more the molecules of the material will vibrate, and as they increase in vibration the hotter the material will become. It has also been found that if two materials are placed between the plates, and one of such materials has a higher heating rate than the other material, the heat generated by the one material can be employed to useful advantage in effecting the other material. Thus, polyethylene is one of the plastics which is unaffected by a dielectric field. It has a power or dissipation factor of less than .0005 at 1 megacycle and this factor holds for both the high, medium and low density polyethylenes. As this power or dissipation factor is representative of the energy loss in the form of heat due to molecular agitation in the confines of the material used as a dielectric, it will be evident that the polyethylene material will have a very slow rate of heating when so used. Nylon tape on the other hand is materially effected by a dielectric field. Thus, it has been found that the power or dissipation factor for the nylon-lycra tapes or webbings embodied in the closure parts previously described is .03 to .04 at 1 megacycle. This figure is only slightly less for cotton-rayon tape or webbing. Thus, these tapes have a substantially faster or higher heating rate than the polyethylene material. Consequently, when a closure part composed of nylon or cotton-rayon webbing or tape located between two layers of polyethylene as in the constructions above described is placed between the electrodes of a high frequency generator, the loss factor being substantially greater in the nylon or cotton-rayon webbing will cause sufficient heat to be generated to melt the polyethylene and to cause the latter and the nylon or rayon of the webbings or tapes to flow together and unite to produce a secure union or seal therebetween. Due to the low rate of heating of the polyethylene, only the inner sides or surfaces of the layers or fingers thereof adjacent to the tape material, will melt and make a seal with the fast melting material of the tape, and the outer or exterior sides or surfaces of such layers will remain unaffected. The seal between the plastic part and the tape material will be accomplished in from 2 to 4 seconds. It will be understood that the tapes of the finished closures may also be dielectrically heat sealed to the brassiere proper taking advantage of the power of dissipation factors of the different materials involved.

Figure 42:
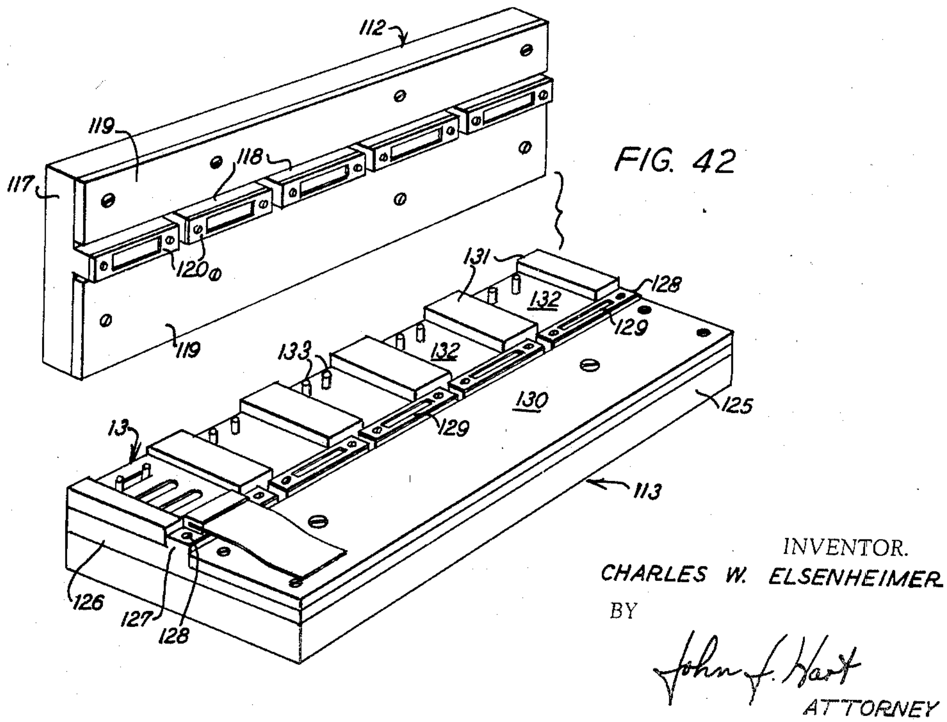
FIG. 42 is a perspective view of the multi-die embodied in the device of FIG. 41.

Referring now more particularly to FIGS. 41 and 42 of the drawings, the reference numeral 110 indicates the base of the dielectric unit on which are mounted two safety start switches 111, 111 electrically connected to the multi-die composed of an upper die part 112 and a lower die part 113. The multi-die is connected in a known manner by electric cable means 114 to a high frequency generator such as a 3 kw. generator with a frequency of approximately 100 megacycles. Air under pressure is supplied through a conduit 115 to the drive air cylinder 116 for actuating the upper die 112. The pressure delivered to the upper die 112 may be of the order of 30 lbs., but may be varied depending upon the type of seal desired. The dies 112 and 113 in the embodiment disclosed in FIGS. 41 and 42 are constructed to assemble the form of female closure member 13 and its associated tape 11 shown in FIGS. 2–5 of the drawings. In the construction disclosed, the upper die 112 is composed of an electrode plate 117 made of copper or brass and having formed centrally thereof in longitudinally extending relation, five electrodes 118 for simultaneously uniting five female closure parts 13 and tapes 11. Covering the top surfaces of the plate 117 are two plates 119 of refractory material such as lava, transite, lithafrax, etc. The top of each electrode 118 is also covered with a plate 120 of refractory material except for the central portion thereof which is exposed by an elongated central opening 121 in the plate 120. The top of each electrode 118 is cut back so the upper surface of the plate 120 is flush with the top exposed surface of such electrode, thereby assuring that the area of the closure member subjected to the action of the electrode will be flat when finished. The advantage of this construction is that the refractory plate 120 will prevent arcing around the plastic member, or burning or searing of the tape during the sealing operation.

The lower die 113 is composed of a base plate 125 on which is mounted an electrode plate 126 made of copper or brass and provided with a longitudinally extending series of bottom electrodes 127 which register with the top electrodes 118 when the die is closed. The bottom electrodes 127, like the top electrodes 118, are covered in part by refractory plates 128 provided with central openings 129 and mounted on such electrodes so that the top surfaces thereof are flush with the exposed surfaces of the bottom electrodes. On one side of the bottom electrodes 127, the electrode plate is covered by a transite or lava plate 130. On the other side of the bottom electrodes, spacer blocks 131 of transite or lava subdivide the length of the electrode plate to form five compartments in which are located the female closure members 13 to be united to their associated tapes 11. The areas of the electrode plate between the blocks 131 are covered with plates 132 of transite or lava. These areas may also be provided with locating pins 133 enabling the proper registry of the portions of the closure members 13 which are to be heat sealed between the top and bottom electrodes. It is believed that the manner in which this sealing will be accomplished has been adequately hereinabove explained.

While I have hereinabove described and illustrated in the drawings, preferred embodiments of my invention, it will be understood by those skilled in the art that various changes and modifications may be made therein without departing from the spirit of the invention.

I claim:

1. A fastening device for an article comprising a pair of flexible tapes, each having connected to one end thereof, a closure member interengageable in interlocking relation with the closure member on the other tape, each of said closure members forming an extension of said one end of its associated tape and having at its inner end a root section connected to such tape end, the portions of said closure members projecting from said root portions thereof being adapted to be interengaged in overlapping relation, one of said overlapping projecting portions comprising an elongated transverse locking element having two transverse sides of different configurations, and the other of said overlapping projecting portions being flexible longitudinally and comprising a transverse slot engageable by said locking element, the sides of said slot being differently configured and having configurations different from the configurations of said locking element sides, one side of said locking element having a shoulder configured to enable such element to interengage with one side of said slot by endwise movement of said one projecting portion relative to said other projecting portion, and the other side of said locking element having a shoulder to enable such element to interengage with the other side of the slot by a snap action under pressure applied upon said one projecting portion, and to disengage from such slot when said other projecting portion is flexed away from said one projecting portion so as to break the locked relation of said other transverse locking element side and said other slot side.

2. A fastening device as defined in claim 1 in which said locking element has a generally foot-like shape in cross-section, with the shoulder on said one side of said locking element constituting the toe of such section, and with the shoulder on the other side of said locking element constituting the heel of such section, said one side of said locking element having a greater longitudinal dimension than said other side thereof.

3. A fastening device as defined in claim 2, in which said shoulder on said other side of said locking element is located closer to the body of said one projecting portion than is said shoulder on the other side thereof.

4. A fastening device as defined in claim 2, in which said locking element has an outer transverse substantially wide, plane surface, the sides of which are defined by said shoulders.

5. A fastening device as defined in claim 4, in which said plane surface inclines outwardly from said shoulder on said other side of the locking element towards the shoulder on said one side thereof.

6. A fastening device as defined in claim 1, in which that side of said slot located closer to the attached end of said other projecting portion is reduced in thickness on the underside thereof, and in which said other transverse side of said locking element has a transverse slot located inwardly from said shoulder thereof for receiving said reduced slot side.

7. A fastening device for an article comprising a pair of flexible tapes, each having connected to one end thereof, a closure member constituted of resilient plastic material and interengageable in interlocking relation with the closure member on the other tape, each of said closure members forming an extension of said one end of its associated tape and having at its inner end a root section connected to such tape end, the portions of said closure members projecting from said root portions thereof being adapted to be interengaged in overlapping relation, one of said overlapping projecting portions comprising an elongated transverse locking element, and the other of said overlapping projecting portions comprising a plurality of longitudinally arranged transverse slots selectively engageable by said locking element, said other projecting portion being flexible longitudinally, and the side edges of each of said slots thereof being differently configured, that side edge thereof closer to the attached end of said other projecting portion being reduced in thickness on the underside thereof, and the other side edge of each slot having at least one transverse tapered portion extending outwardly from a transverse line within the slot toward a side of said other projecting portion and away from said reduced slot side edge, said locking element having a shoulder on each side thereof and being configured to interengage with the side edges of each of said slots and to disengage from the latter when said other projecting portion is flexed away from said one projecting portion.

8. A fastening device as defined in claim 7, in which said reduced edge is formed to provide an outer flange-like edge portion having its inner surface located within the slot in proximate alignment with the inner edge of said transverse tapered side edge portion.

9. A fastening device for an article comprising a pair of flexible tapes, each having connected to one end thereof, a closure member interengageable in overlapping interlocking relation with the closure member on the other tape, one of said closure members comprising a transverse slot having in cross-section an inner bar receiving portion of substantially circular form and an outer entry portion of reduced dimension, and the other of said closure members comprising two spaced longitudinally disposed supporting members and a transverse locking bar secured at its ends to said supporting members, said locking bar having a circularly-shaped body of a diameter greater than the cross-sectional dimension of the outer entry portion of said slot and fitting in the inner bar receiving portion of such slot, and said locking bar having integrally formed along one side thereof a transversely extending rib portion to give said locking bar a substantially tear-shaped configuration in cross-section, said rib portion being provided on that side of said locking bar which faces toward the outer entry end of said slot when said bar is positioned in such slot and being located between the side wall portions of such slot forming such outer entry end thereof in the interengaged condition of said slot closure members.

10. A fastening device for an article comprising a pair of flexible tapes, each having connected to one end thereof, a closure member interengageable in overlapping relation with the closure member on the other tape, one of said closure members comprising two spaced longitudinally disposed paired members constituted of resilient plastic material and having aligned openings for receiving spaced portions of a locking element on the other of said closure members, each of said aligned openings being composed of a substantially circular hole located between the inner and outer surfaces of the paired member in which it is provided, and a V-shaped notch formed in the outer portion of such paired member with its wide end forming an opening in such outer surface of said member and its narrow end communicating with said circular hole, and the other of said closure members comprising a locking element having two transversely spaced round locking portions receivable in the V-shaped notches of said aligned openings and adapted to be pressed therethrough into the associated circular holes thereof.

11. A fastening device as defined in claim 1, in which that side of said slot which is positioned farther from the attached end of said other projecting portion has an inclined transverse surface portion extending from a transverse line within the slot toward the underside of said other projecting portion and away from the other side of said slot, and in which said shoulder on said one side of said locking element cooperates with said inclined surface to effect the locked relation of said locking element and slot.

12. A fastening device as defined in claim 11, in which said farther slot side has a second inclined transverse surface portion extending substantially from said transverse line toward the upper side of said other projecting portion and away from said other side of the slot to provide a narrowed edge portion within the slot.

13. A fastening device as defined in claim 11, in which said other side of said slot is reduced in thickness on the underside thereof to a depth approximating said transverse line, and in which said other transverse side of said locking element has a transverse slot located inwardly from said shoulder thereof for receiving said reduced other slot side.

14. A fastening device as defined in claim 1, in which said one projecting portion has a single locking element provided thereon, and in which said other projecting portion is provided with a plurality of longitudinally arranged transverse slots selectively engageable by said single locking element.

References Cited

UNITED STATES PATENTS

| | | | |
|---|---|---|---|
| 3,204,636 | 9/1965 | Karlher | 24—204 X |
| 3,263,292 | 8/1966 | Fekete | 24—204 X |

FOREIGN PATENTS

| | | |
|---|---|---|
| 1,189,331 | 10/1959 | France. |

BERNARD A. GELAK, Primary Examiner

U.S. Cl. X.R.

24—204, 216